(12) United States Patent
Hubbe et al.

(10) Patent No.: US 12,212,643 B2
(45) Date of Patent: Jan. 28, 2025

(54) METHODS AND SYSTEMS FOR PROVIDING A DISTRIBUTED CLOCK AS A SERVICE

(71) Applicant: Pensando Systems Inc., Milpitas, CA (US)

(72) Inventors: Allen Hubbe, Durham, NC (US); Varagur Chandrasekaran, Fremont, CA (US); Shrikant Vaidya, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 499 days.

(21) Appl. No.: 17/364,734

(22) Filed: Jun. 30, 2021

(65) Prior Publication Data

US 2023/0006807 A1 Jan. 5, 2023

(51) Int. Cl.
*H04L 7/00* (2006.01)
*H04J 3/06* (2006.01)
*H04L 69/28* (2022.01)

(52) U.S. Cl.
CPC .......... *H04L 7/0008* (2013.01); *H04J 3/0667* (2013.01); *H04L 69/28* (2013.01)

(58) Field of Classification Search
CPC ............ H04L 7/0008; H04L 69/28; G06F 2009/45587; G06F 2009/45595; G06F 9/45558; H04J 3/0667
(Continued)

(56) References Cited

U.S. PATENT DOCUMENTS

| | | |
|---|---|---|
| 9,344,265 B2 | 5/2016 | Karnes |
| 10,148,411 B2 | 12/2018 | Kirrmann et al. |

(Continued)

FOREIGN PATENT DOCUMENTS

| | | | |
|---|---|---|---|
| CN | 104135372 A | * 11/2014 | ......... H04L 41/0659 |
| CN | 102104476 B | 1/2015 | |

(Continued)

OTHER PUBLICATIONS

IEEE, "IEEE Standard for a Precision Clock Synchronization Protocol for Networked Measurement and Control Systems", IEEE Std 1588™ _2019; Nov. 7, 2019, 500 pgs.

(Continued)

*Primary Examiner* — David R Lazaro
*Assistant Examiner* — Mariegeorges A Henry
(74) *Attorney, Agent, or Firm* — LOZA & LOZA, LLP; Richard H. Krukar

(57) ABSTRACT

Tenants in data centers may want access to high precision clocks without having to run their own PTP stacks or reference clocks. Furthermore, different tenants may want their workloads synchronized to their own secured clock domain. PTP, the currently dominant synchronization protocol, allows for only 256 clock domains (CDs). Virtual CDs (vCDs) virtualize the concept of clock domains by maintaining a hardware clock within a host computer, receiving a network clock domain packet that includes a clock domain identifier and an origin timestamp produced by a reference clock, using the network clock domain packet to synchronize the hardware clock to the reference clock, and using the hardware clock to provide a hardware timestamp value to a virtual machine (VM) running on the host computer or to a process running on the host computer, wherein the hardware clock is secured from manipulation by the VM or by the process.

20 Claims, 13 Drawing Sheets

(58) Field of Classification Search
USPC .......................................................... 709/248
See application file for complete search history.

(56) References Cited

U.S. PATENT DOCUMENTS

| | | | | |
|---|---|---|---|---|
| 2007/0174022 | A1* | 7/2007 | Wiles | G05B 23/0221 |
| | | | | 340/539.22 |
| 2012/0030495 | A1* | 2/2012 | Chandhoke | G06F 1/10 |
| | | | | 713/400 |
| 2013/0326088 | A1* | 12/2013 | Uchida | H04J 3/0667 |
| | | | | 709/248 |
| 2020/0401434 | A1* | 12/2020 | Thampi | H04J 3/0667 |
| 2021/0141413 | A1* | 5/2021 | Levi | G06F 1/14 |
| 2021/0306262 | A1* | 9/2021 | Shmatko | H04L 45/586 |

FOREIGN PATENT DOCUMENTS

| | | | | |
|---|---|---|---|---|
| CN | 111867073 A | * | 10/2020 | |
| EP | 1841124 A1 | * | 10/2007 | .......... G06F 21/725 |

OTHER PUBLICATIONS

Wikipedia, "Network address translation—5 Wikipedia, the free encyclopedia", https://en.wikipedia.org/w/index.php?title=Network_address_translation&oldid=442836098, retrieved from the internet Jun. 18, 2015, 3 (Aug. 3, 2011), pp. 1-13.

Partial European Search Report, (EP22181153), Nov. 16, 2022, 4 pgs.

Loschmidt, Patrick et al. "Limits of Synchronization Accuracy Using Hardware Support in IEEE 1588", ISPCS 2008 - International IEEE Symposium on Precision Clock Synchronization for Measurement, Control and Communication Ann Arbor, Michigan, Sep. 22-26, 2008; pp. 12-16.

Calnex Solutions Ltd., "Implementing IEEE 1588v2 for use in the mobile backhaul", Technical Brief, 2009, 24 pgs.

Vainman, Alex "PTP in Media Virtualized Environment", IP Showcase Theatre at IBC2019 : Sep. 13-17, 2019, 9 pgs.

Ohly, Patrick et al. "Hardware Assisted Precision Time Protocol. Design and case study.", 2008, 19 pgs.

* cited by examiner

| Virtual Clock Domain (vCD) to Clock Domain (CD) to Hardware (HW) Clock Mapping Table 109 ||||
|---|---|---|---|
| vCD Identifiers 202 | CD Identifiers 203 | VLAN Identifiers 204 | HW Clock Identifiers 205 |
| vCD 1 Identifier | CD 1 Identifier | VLAN 1 Identifier | HW Clock 1 Identifier |
| vCD 2 Identifier | CD 2 Identifier | VLAN 1 Identifier | HW Clock 2 Identifier |
| vCD 1 Identifier | CD 3 Identifier | VLAN 2 Identifier | HW Clock 3 Identifier |
| ⋮ | ⋮ | ⋮ | ⋮ |
| vCD N Identifier | CD M Identifier | VLAN 1 Identifier | HW Clock O Identifier |

FIG. 2

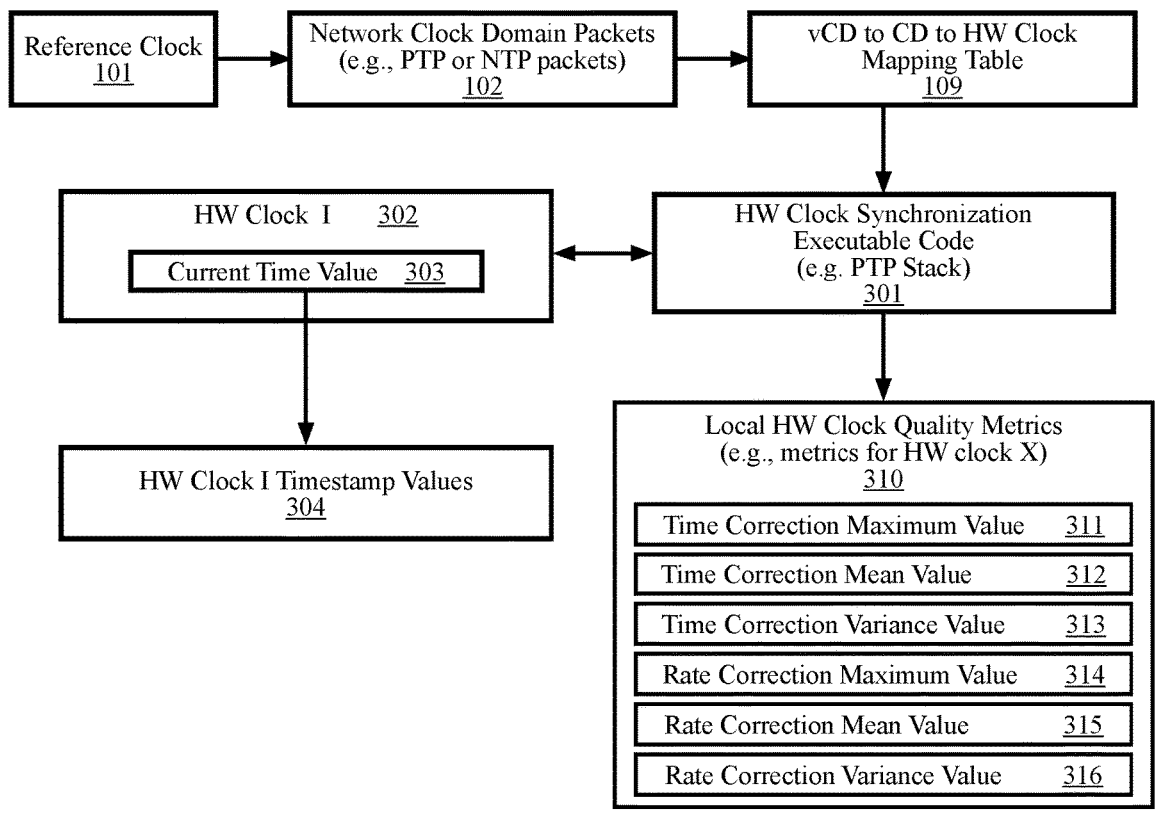

METHODS AND SYSTEMS FOR PROVIDING A DISTRIBUTED CLOCK AS A SERVICE

TECHNICAL FIELD

The embodiments relate to precision time protocol, computer networks, local area networks, network appliances such as routers, switches, network interface cards (NICs), smart NICs, distributed service cards (DSCs), and providing synchronized clocks within virtualized clock domains as a service.

BACKGROUND

The precision time protocol (PTP) has been standardized by the Institute of Electrical and Electronics Engineers (IEEE) in standards including IEEE-1588-2002, IEEE 1588-2008, and IEEE 1588-2019. PTP is used to synchronize clocks throughout a computer network. Such synchronization is used in many applications such as synchronizing output signals, timestamping or synchronizing measurements at disparate locations, coordinating events, etc. Using PTP a number of ordinary clocks can be synchronized to a reference clock. The synchronization can be sub microsecond. The PTP standard also provides for clock domains (CDs). PTP message headers include a 1-byte clock domain identifier field and, as such, there may be up to 256 reference clocks for 256 CDs each having numerous clocks synchronized within their respective clock domains.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include maintaining a hardware clock within a host computer, receiving a network clock domain packet that includes a clock domain identifier and an origin timestamp produced by a reference clock, using the network clock domain packet to synchronize the hardware clock to the reference clock, and using the hardware clock to provide a hardware timestamp value to a virtual machine (VM) running on the host computer or to a process running on the host computer, wherein the hardware clock is secured from manipulation by the VM or by the process.

Another aspect of the subject matter described in this disclosure can be implemented by a method. The method can include maintaining a plurality of clock domains on a plurality of hardware clocks in a plurality of network interface cards (NICs) installed in a plurality of host computers, wherein a plurality of clock domain identifiers identify the plurality of clock domains, the NICs are configured to use a network communications protocol to synchronize the hardware clocks within the clock domains, the NICs are configured to associate the clock domain identifiers with a plurality of virtual clock domain identifiers that identify a plurality of virtual clock domains, and a plurality of virtual machines (VMs) running on the host computers obtain hardware timestamp values from the NICs via the virtual clock domain identifiers.

Yet another aspect of the subject matter described in this disclosure can be implemented by a peripheral component card. The peripheral component card be configured to implement a plurality of hardware clocks, be installed in a host computer, use a network communications protocol to synchronize the hardware clocks within a plurality of clock domains identified by a plurality of clock domain identifiers, associate the clock domain identifiers with a plurality of virtual clock domain identifiers that identify a plurality of virtual clock domains, and provide a hardware timestamp value to a virtual machine running on the host computer based on the one of the virtual clock domains associated with the virtual machine.

In some implementations of the methods and devices, the method can include providing a local hardware clock quality metric to the VM. In some implementations of the methods and devices, a network interface card (NIC) that includes the hardware clock is installed in the host computer, the NIC receives the network clock domain packet, and the NIC synchronizes the hardware clock to the reference clock. In some implementations of the methods and devices, the hardware clock is secured from manipulation by any process or VM running on the host computer. In some implementations of the methods and devices, the NIC associates a virtual clock domain identifier with the clock domain identifier, and the VM uses the virtual clock domain identifier to obtain the hardware timestamp value. In some implementations of the methods and devices, the VM and the clock domain identifier are associated with a virtual clock domain identifier, the virtual clock domain identifier identifies a virtual clock domain of the VM. In some implementations of the methods and devices, a plurality of VMs running on a plurality of host computers are associated with a virtual clock domain identifier that identifies a virtual clock domain, a plurality of NICs installed in the host computers synchronize a plurality of hardware clocks in the virtual clock domain, and the VMs obtain a plurality of hardware timestamp values from the plurality of hardware clocks. In some implementations of the methods and devices, the VM is associated with a virtual clock domain identifier that identifies a virtual clock domain, a second NIC is installed in a second host computer, and migrating the VM to the second host computer includes instantiating the virtual clock domain at the second NIC. In some implementations of the methods and devices, the NIC associates a virtual clock domain identifier with the clock domain identifier, a second NIC is installed in a second host computer and includes a second hardware clock, the hardware clock and the second hardware clock are synchronized within a virtual clock domain identified by the virtual clock domain identifier, and the second NIC associates the virtual clock domain identifier with a second clock domain identifier that is different from the clock domain identifier. In some implementations of the methods and devices, the network clock domain packet is received on a first virtual local area network, a second network clock domain packet is received on a second virtual local area network, the second network clock domain packet and the network clock domain packet include the same clock domain identifier, the clock domain identifier of the network clock domain packet identifies a first clock domain, the clock domain identifier of the network clock domain packet identifies a second clock domain that is different from the first clock domain. In some implementations of the methods and devices, the hardware clock is secured from manipulation by the host computer.

In some implementations of the methods and devices, each one of the NICs is configured to instantiate the virtual clock domains based on virtual clock domain instantiation data received from another one of the NICs. In some implementations of the methods and devices, the VMs are prevented from manipulating the hardware clocks. In some implementations of the methods and devices, the NICs are configured to use a virtual local area network (VLAN) to synchronize the hardware clocks, the VLAN is configured to exclude network traffic to or from any one of the VMs.

In some implementations of the methods and devices, the peripheral component card is configured to receive virtual clock domain instantiation data for an additional virtual clock domain, and provide an additional hardware timestamp value based on the additional virtual clock domain. In some implementations of the methods and devices, the peripheral component card is configured to produce virtual clock domain instantiation data based on one the virtual clock domains, and transmit the virtual clock domain instantiation data to an additional peripheral component card. In some implementations of the methods and devices, the peripheral component card is configured to provide a local hardware clock quality metric to the VMs. In some implementations of the methods and devices, the peripheral component card is a network interface card configured to provide network communications to the host computer.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 2 is a high-level diagram illustrating a mapping between virtual clock domains (vCDs), clock domains (CDs), and hardware clocks according to some aspects.

FIG. 3 is a high-level diagram illustrating local hardware clock quality metrics gathered for a hardware clock according to some aspects.

Throughout the description, similar reference numbers may be used to identify similar elements.

DETAILED DESCRIPTION

Figure 1:
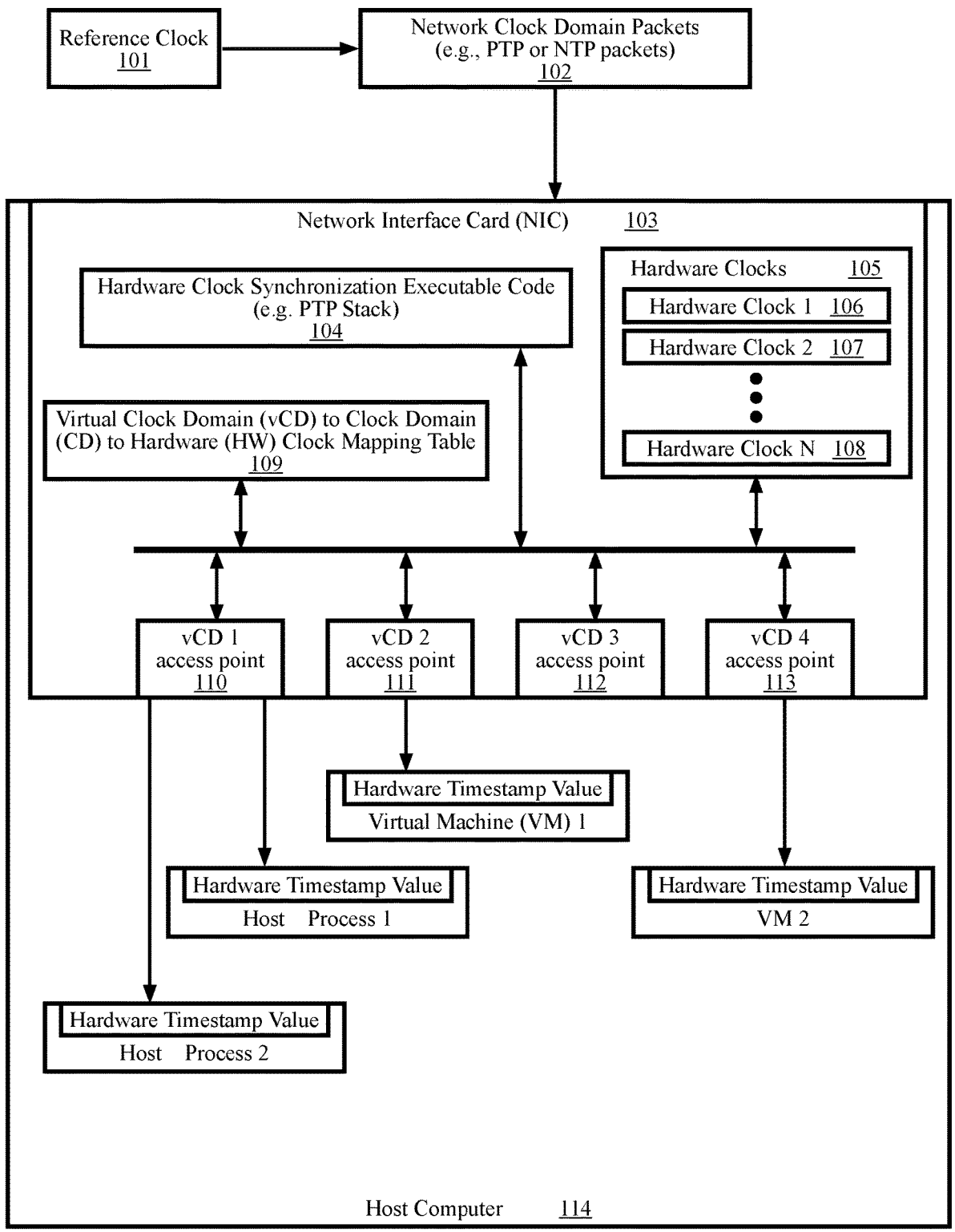
FIG. 1 is a functional block diagram of virtual machines (VMs) obtaining timestamps from virtual clock domains according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The precision time protocol (PTP) has been standardized by the Institute of Electrical and Electronics Engineers (IEEE) in standards including IEEE-1588-2002, IEEE 1588-2008, and IEEE 1588-2019. PTP is used to synchronize clocks throughout a computer network. Using PTP a number of ordinary clocks can be synchronized to a reference clock. The synchronization can be sub microsecond. The PTP standard also provides for clock domains (CDs). PTP message headers have a 1-byte clock domain identifier and, as such, there may be up to 256 reference clocks for 256 CDs each having numerous clocks synchronized within their respective clock domains. Data centers, however, can have tens of thousands of servers running hundreds of thousands or millions of virtual machines on tens of thousands of subnets. Furthermore, a tenant's workloads may be in different areas of the data center or even in different data centers. The tenant's workloads can include numerous VMs that may migrate from one server to a different server. The servers can be physically separated in different racks or data centers.

The timing requirements of advanced data centers can be met using virtual CDs. A tenant's VMs can use a vCD that is dedicated to that particular tenant. The vCDs can map to CDs within a LAN such that VMs on different LANs can access the same vCD and receive time values or timestamps provided by local clocks. The local clocks within a LAN or a server can be assigned to a vCD such that they are synchronized across the data center to other local clocks assigned to the same vCD. vCD coordination and synchronization can be provided as a service within a data center with guaranteed quality of service parameters (e.g., synchronized to less than 1 microsecond across servers in North American data centers). Such precise synchronization can provide for precision in making and coordinating measurements, timestamping transactions, coordinating events, and other uses.

One advantage of using vCDs is that millions or billions of vCDs can be used thereby providing many orders of magnitude improvement over the 256 CDs currently available. Another advantage is that a virtual machine can be migrated between servers without losing synchronization with the other VMs in a workload. Another advantage is that by providing vCDs as a service, the tenant is freed from running and maintaining PTP stacks. A vCD service provider can run PTP stacks on bare metal (bare metal means not a VM) or in dedicated hardware such as a distributed service card or smartNIC, thereby improving reliability and precision. A vCD service provider can secure the vCDs such that a tenant's vCD cannot be snooped on or modified by interlopers or even the tenants themselves. For example, the service provider's PTP traffic can be communicated on a VLAN to which VMs and host processes do not have access. SmartNICs can implement such security by firewalling VM and host computer traffic from the secured VLAN. In such implementations, the secured VLAN may carry SmartNIC traffic while using other VLANs for host computer and VM traffic. Communications for synchronizing, orchestrating, and maintaining the vCDs may also be secured via encryption. Providing encrypted network communications is well known in the art of computer networking.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of virtual machines (VMs) obtaining timestamps from virtual clock domains according to some aspects. A reference clock 101 can send network clock domain packets 102 (e.g., PTP or network time protocol (NTP) packets) to a network interface card 103 (NIC) installed in a host computer 114. The NIC can be a distributed service card or a smartNIC. The NIC 103 can include numerous hardware clocks 105 such as hardware clock 1 106, hardware clock 2 107, and hardware clock N 108. "N" is used herein to refer to integral values in general and different uses of "N" may be the same or different values. Hardware clock synchronization executable code 104 is computer code that can be executed to thereby synchronize one or more of the hardware clocks 105 to one or more reference clocks. For example, and as is well known in the art, the reference clock can be the reference clock for a specific CD, PTP packets can be used for synchronization within that CD, and PTP stacks can process the PTP packets to thereby synchronize one or more of the HW clocks 105 to the reference clock 101. A virtual clock domain (vCD) to clock domain (CD) to hardware (HW) clock mapping table 109 can indicate which HW clock is in which CD such that the hardware clock synchronization executable code 104 can synchronize the HW clocks within the correct CDs.

The vCD to CD to HW clock mapping table 109 can also indicate which HW clock corresponds to each vCD. CDs and vCDs are therefore also associated via the vCD to CD to HW clock mapping table 109. Processes and VMs running on the host computer can obtain HW timestamp values via vCD access points that may be provided by the NIC 103. Host process 1 and host process 2 can obtain vCD 1 timestamps via a vCD 1 access point 110. VM 1 can obtain vCD 2 timestamps via a vCD 2 access point 111. VM 2 can obtain vCD 4 timestamps via a vCD 4 access point 113. The vCD 3 access point 112 is shown as not in use.

FIG. 2 is a high-level diagram illustrating a mapping between virtual clock domains (vCDs), clock domains (CDs), and hardware clocks according to some aspects. More specifically, an exemplary vCD to CD to HW clock mapping table 109 is illustrated that provides a mapping between virtual clock domains (vCDs), clock domains (CDs), and hardware clocks. The vCD to CD to HW clock mapping table 109 can associate vCD identifiers 202, CD identifiers 203, VLAN identifiers 204, and HW clock identifiers 205. As discussed above, CD identifiers in PTP are 8-bit values. As such, each LAN can have up to 256 CDs. The infrastructure (e.g., cables, layer 2 switches, and NICs) supporting a LAN may also support a number of VLANs. Each VLAN may also support up to 256 CDs. Observing the entries in the vCD to CD to HW clock mapping table 109, the first row indicates that HW clock 1 is synchronized to CD 1 on VLAN 1 and that time values for vCD 1 can be obtained by reading HW clock 1. The second row indicates that HW clock 2 is synchronized to CD 2 on VLAN 1 and that time values for vCD 2 can be obtained by reading HW clock 2. The third row indicates that HW clock 3 is synchronized to CD 3 on VLAN 2 and that time values for vCD 1 can be obtained by reading HW clock 3. It therefore appears that values for vCD1 can be obtained from HW clock 1 or HW clock 3. The NIC may select which HW clock to use based on the HW clocks' synchronization states or local HW clock quality metrics.

FIG. 3 is a high-level diagram illustrating local hardware clock quality metrics 310 gathered for a hardware clock according to some aspects. A reference clock 101 can provide network clock domain packets 102 (e.g., PTP or network time protocol (NTP) packets) that can be used for synchronizing HW clocks within a clock domain. The network clock domain packets 102 can indicate a CD for that synchronization. The vCD to CD to HW clock mapping table 109 can indicate that HW clock I 302 is to be synchronized within that CD. The HW clock synchronization executable code 301 can therefore use the network clock domain packets 102 to synchronize HW clock I 302 within the CD (this synchronizes HW clock I 302 to the reference clock 101). HW clock I 302 has a current time value 303 that can be read to obtain HW Clock I timestamp values 304. The HW clock synchronization executable code 301 can also produce local HW clock quality metrics 310 for local clocks such as HW clock I 302. The quality metrics can include a time correction maximum value 311, a time correction mean value 312, a time correction variance value 313, a rate correction maximum value 314, a rate correction mean value 315, and a rate correction variance value 316.

A HW clock has a current time value and advances at a rate. The rate can be proportional to a timing signal such as pulses in a clock signal. The HW clock synchronization executable code 301 can detect that the HW clock is ahead of or behind the reference clock. As such, a time correction can set the HW clock to the correct value. The HW clock synchronization executable code 301 can detect that the HW clock is advancing too quickly or too slowly with respect to the reference clock. As such, a rate correction can adjust the rate at which the HW clock advances. Those practiced in clock synchronization or PTP stacks are familiar with time corrections and rate corrections. Statistics such as the maximum, mean, and variance can be determined for the time corrections and the rate corrections. Algorithms for calculating maximum, mean, and variance are well known in the programming arts. The local HW clock quality metrics 310 can be stored locally, such as on the NIC 103. The local HW clock quality metrics 310 can be exported to or read by the host machine in which the NIC (or other device providing HW clocks) is installed. The local HW clock quality metrics 310 can be exported to a remote data collector that may be collecting similar metrics from a plethora of devices. For example, a service provider that provides distributed clocks or vCDs as a service may collect the metrics for display on a centralized dashboard or for analyzing the performance of the distributed clock service.

Figure 4:
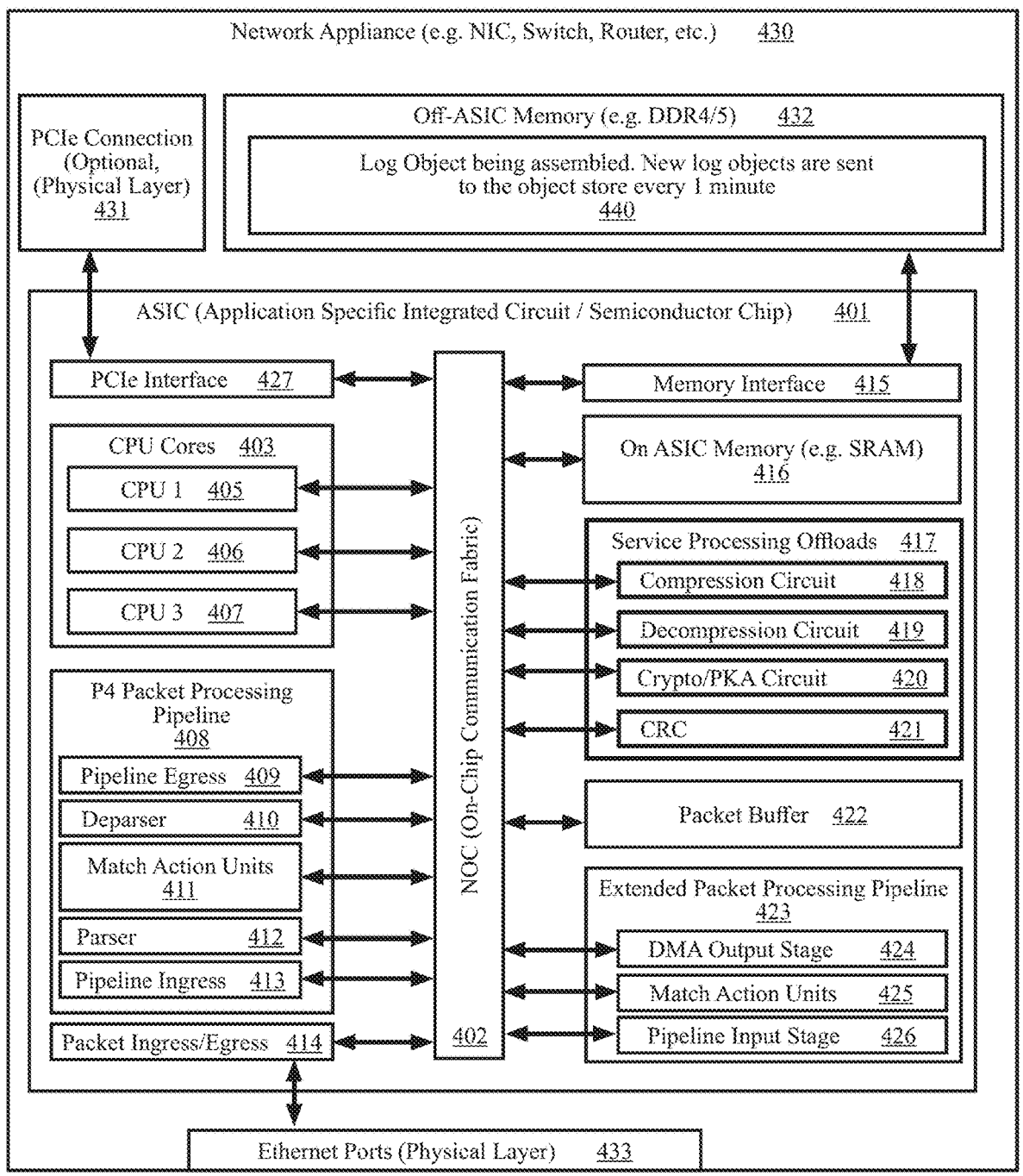
FIG. 4 is a functional block diagram of a network appliance having an ASIC (application specific integrated circuit), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a peripheral component interconnect express (PCIe) connection 431 for communicating with the host computer. The network appliance 430 can have an ASIC 401, off-ASIC memory 432, and ethernet ports 433. The off-ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 can be selected such that the ASIC implements many, perhaps all, of the functionality of an InfiniBand channel adapter, of an NVMe card, and of a network appliance that processes network traffic flows carried by IP (internet protocol) packets.

A network device can include clocks such as a precision clock that outputs a precise time, and clocks that are synchronized to remote authoritative clocks (e.g., reference clock) via PTP (e.g., HW clocks). The precision clock 426 can be synchronized to a remote authoritative clock via PTP, NTP, or some other technique. The network device can include an ASIC clock 424 that provides a timing signal (e.g., a series of pulses or a square wave). A cycle counter 425 can count cycles of the ASIC clock 424. A cycle count can indicate an elapsed time (e.g., clock period times number of cycles). In some implementations, a rate correction may be applied to a clock producing a time signal, such as the ASIC clock 424, to thereby adjust the rate at which the cycle counter 425 advances. The precision clock 426, cycle counter 425, and ASIC clock 424 can be used as timing sources for derived hardware clocks 443.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P4$_{16}$ Language Specification," version 1.2.1, as published by the P4 Language Consortium on Oct. 12, 2020. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that implements and maintains virtual clock domains can store hardware clock quality metrics 440, vCD to CD to HW clock mappings 441, hardware clock parameters 442, and derived HW clocks 443. The derived HW clocks can provide current time values within a clock domain and can be specified in reference to a different timing source such as the ASIC clock, cycle timer, precision clock, a different derived HW clock, etc. The HW clock parameters can define the relationships between the derived HW clocks and their timing sources. For example, HW clock 1 can be specified as having a +1.3 millisecond offset from HW clock 2. HW clock 2 can be specified in reference to the precision clock 426 as having a −1.1 microsecond offset at a specific time and to have a +0.001 rate difference. Those practiced in synchronizing clock signals are familiar with a wide variety of methods for implementing and maintaining derived clocks.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 423 can act as a central on-chip packet switch that delivers packets from the network interfaces 433 to packet processing elements of the data plane and vice-versa. The packet processing elements can include a slow data path implemented in software and a fast data path implemented by packet processing circuitry 408.

The packet processing circuitry 408 can be a specialized circuit or part of a specialized circuit using one or more ASICs or FPGAs to implement programmable packet processing pipelines 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
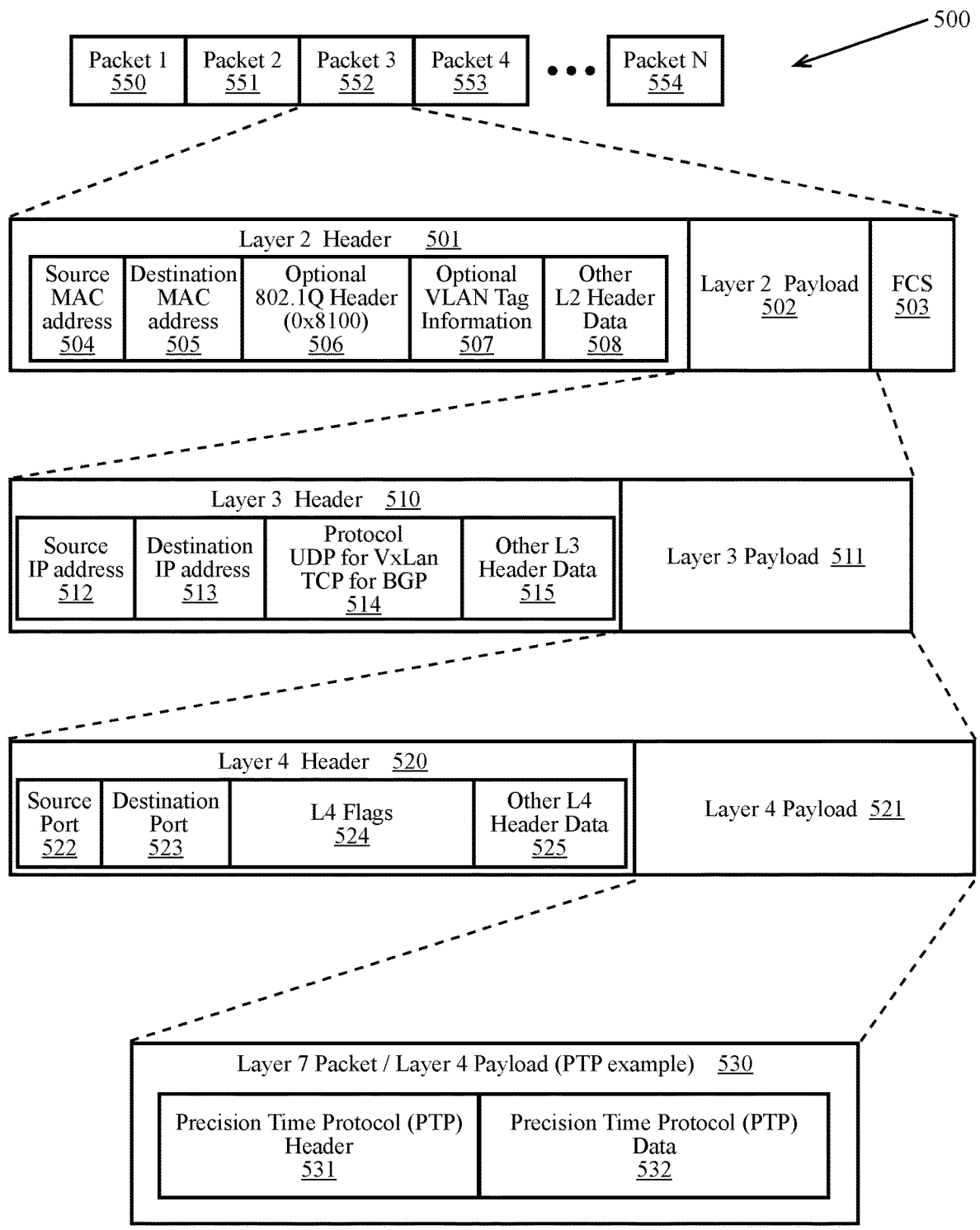
FIG. 5 illustrates packet headers and payloads of packets for network traffic flows including layer 7 fields according to some aspects.

FIG. 5 illustrates packet headers and payloads of packets for network traffic flows 500 including layer 7 fields according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" may refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. Ethernet ports 433 can send and receive packets as raw bit streams.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, an optional 802.1Q header 506, optional VLAN tag information 507, and other layer 2 header data 508. The input ports and output ports of a network appliance can have MAC addresses. A network appliance can have a MAC address that is applied to all or some of the ports. Alternatively, a network appliance may have one or more ports that each have their own MAC address. In general, each port can send and receive packets. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 506 and VLAN tag information 507 are specified by the IEEE 802.1Q standard. The 802.1Q header is the two-octet value 0x8100 that indicates that VLAN tag information 507 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 430. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, often called datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet.

The application layer, often called layer 7, includes the protocols used by most applications for providing user services or exchanging application data over the network connections established by the lower-level protocols. Examples of application layer protocols include Precision Time Protocol (PTP), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 521 may include a layer 7 packet 530. A layer 7 packet can have a layer 7 header 531 and a layer 7 payload 532. The illustrated layer 7 packet is a PTP packet. The IEEE published the specification IEEE 1588-2019 that describes and standardized the PTP protocol. PTP can be carried by UDP packets at layer 3 or by layer 2 packets such as ethernet packets.

Figure 6:
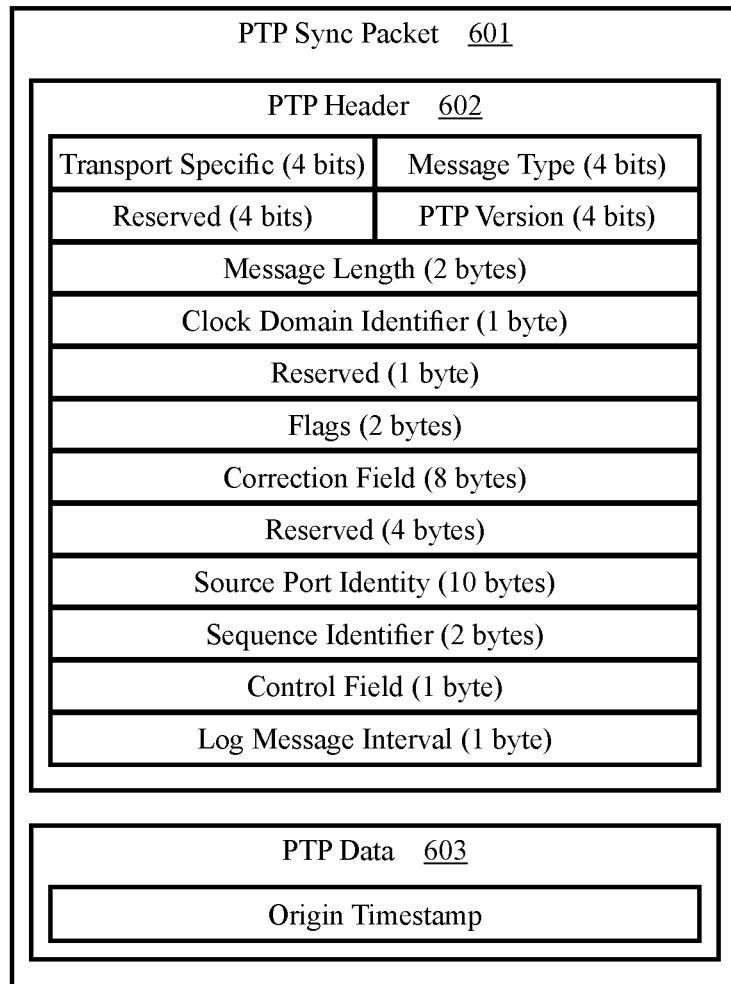
FIG. 6 illustrates a PTP sync packet that can be used in accordance with certain aspects.

FIG. 6 illustrates a PTP sync packet 601 that can be used in accordance with some aspects. The PTP packet includes a PTP header 602 and PTP data 603. The PTP header includes a message type field, a message length field, a clock domain identifier, flags, a correction field, a source porty identity, a sequence identifier, a control field, and a log message interval. The message type field can indicate the type of message (e.g., sync, delay request, delay response, etc.). The message length field indicates the full length of the PTP message. The clock domain identifier indicates the clock domain the PTP message belongs to. A clock domain is a logical grouping of clocks that synchronize to each other using PTP. The clocks in one domain are not necessarily synchronized to those in another domain. The flags field can indicate status. The correction field includes a correction value in nanoseconds that indicates residence time within a transparent clock and, for peer-to-peer transparent clocks, includes the path delay. The source port identity field identifies the originating port for the PTP message. The sequence identifier field can contain a sequence number for individual message types. The control field may contain a value that depends on the message type. The log message interval field is determined by the type of the message. The PTP data 603 includes an origin timestamp. The origin timestamp indicates the time that the PTP packet was transmitted by its originator.

Devices (e.g., a PCIe card and a host computer) can communicate over a PCIe bus using PCIe messages and PCIe protocols in accordance with standards published by PCI-SIG. A PCIe device, such as NIC 430, can implement PCIe physical functions (PFs) and PCIe virtual functions (VFs). In general, host processes using the host's device drivers access the PCIe PFs while VMs running on the host computer can use the VMs' device drivers to access the PCIe VFs. The VM's are typically prevented from directly accessing the PCIe PFs. PCIe SR-IOV is a technology that was standardized in "Single Root I/O Virtualization and Sharing Specification Revision 1.1" published by PCI-SIG on Jan. 20, 2010. In accordance with the standard, a SR-IOV capable PCIe card can provide PFs and numerous VFs. A smartNIC or other device implementing vCDs can provide access to HW clocks via PCIe PFs and VFs.

Figure 7:
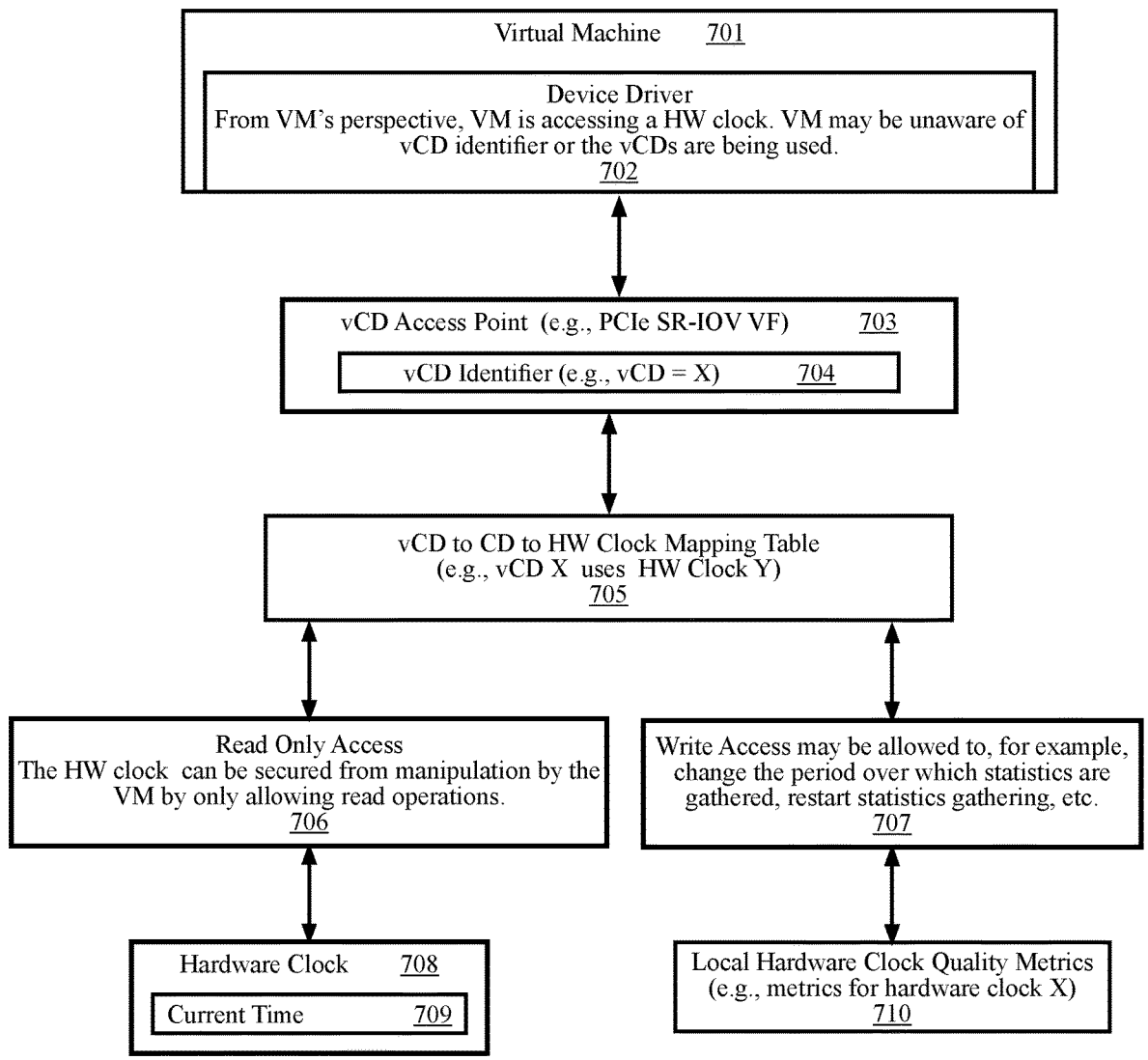
FIG. 7 is a high-level diagram illustrating a virtual machine accessing a hardware clock via a virtual clock domain (vCD) access point according to some aspects.

FIG. 7 is a high-level diagram illustrating a virtual machine 701 accessing a hardware clock 708 via a virtual clock domain (vCD) access point 703 according to some aspects. A process running in a VM 701 can attempt to read a time value from a HW clock. The process can use the VM's device driver 702 to access a VF that functions as a vCD access point. From the VM's perspective, the device driver may be providing access to a system's only hardware clock. From the perspective of the PCIe device (e.g., smart-NIC 430) the VM can be accessing a vCD access point 703 that is implemented as a PCIe VF. The vCD access point can be configured with a vCD identifier 704 that identifies the vCD associated with the VM. In this manner, the VM can use the vCD to read a HW clock. For example, the VM may be one of a group of VMs implementing a tenant's workload that is synchronized via the vCD. The VM, attempting to read the system clock, tries to read a time value via a VF implementing a vCD access point. The PCIe device can use the vCD to CD to HW clock mapping table 705 and the vCD identifier 704 to identify a HW clock. The current time 709 of the hardware clock 708 can be provided to the VM's device driver 702.

An advantage of providing distributed clocks as a service is that tenants have no need to run their own PTP stacks within their own VMs and have no need to provide reference clocks. Instead, the tenants' VMs can simply read system clocks. Many operating systems already have device drivers for reading system clocks. PCIe devices implementing vCDs can be configured to provide the functions (PF and VF) of system clocks. As such, current operating systems can benefit from the implementation of vCDs because such implementation happens within the PCIe device and is transparent to the operating system. Certain capabilities, however, may be disabled. VMs and, in some cases, host computers may have read only access 706 to the HW clocks via the vCD access points. Read only access prevents conditions such as a VM running a PTP stack and modifying a HW clock while the PCIe device also runs a PTP stack that maintains the same HW clock. The VMs and, in some cases, host computer processes may have read only access to the local hardware clock quality metrics 710. Alternatively, write access may be granted to some aspects of the local hardware clock metrics. For example, the statistics may be initialized, gathering statistics may be halted or restarted, and periods over which to gather statistics may be set, etc. Administrators/orchestrators of the data center or vCD service may have write access to the PCIe device. For example, the PCIe device may be accessed using a terminal service, graphical user interface, or application program interface (API) calls. Administrative access to the PCIe device can be restricted by, for example, allowing such access only on certain VLANS.

Figure 8:
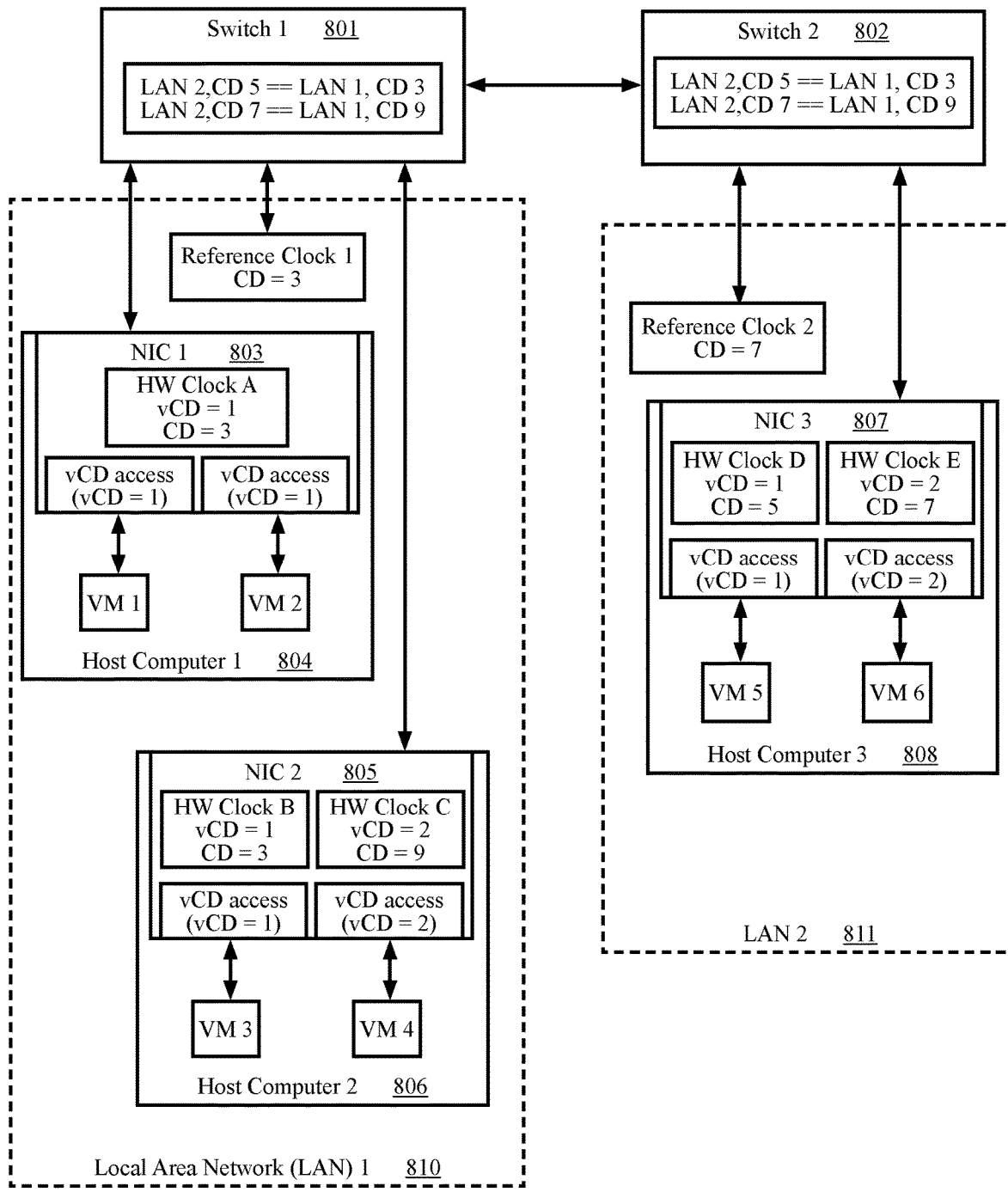
FIG. 8 is a high-level diagram illustrating vCDs distributed across multiple local area networks (LANs) according to some aspects.

FIG. 8 is a high-level diagram illustrating vCDs distributed across multiple local area networks (LANs) according to some aspects. LAN 1 810 and LAN 2 811 can be connected via switch 1 801 and switch 2 802. The LANs may be networks within server racks in a data warehouse. The LANs may be in different data warehouses or in any combination of data warehouses and tenant facilities. Two virtual clock domains are shown. On LAN 1, vCD 1 uses CD 3. On LAN 2, vCD 1 uses CD 5. On LAN 1, vCD 2 uses CD 9. On LAN 2, vCD 2 uses CD 7. In some implementations, the switches are configured to translate packets, such as PTP packets as follows. CD 3 packets on LAN 1 are translated to CD 5 packets on LAN 2. CD 5 packets on LAN 2 are translated to CD 3 packets on LAN 1. CD 9 packets on LAN 1 are translated to CD 7 packets on LAN 2. CD 7 packets on LAN 2 are translated to CD 9 packets on LAN 1. Translation can be accomplished by, for example, rewriting the clock domain field in PTP packets moving from one LAN to another. In other implementations, the clock domains on different LANs or VLANs may be synchronized via other techniques. For example, each CD may be synchronized to a different reference clock and the reference clocks may be synchronized using any technique that is appropriate for the implementation. A vCD may be associated with PTP, NTP, or another technology. Additionally, different vCDs may be associated with different synchronization technologies depending on where they are used. Furthering the example, in one LAN or data center, synchronization of a vCD can be accomplished with PTP and in another data center the same vCD may be synchronized via NTP.

Host computer 1 804, host computer 2 806, and reference clock 1 are on LAN 1 810. Host computer 3 808 and reference clock 2 are on LAN 2 811. A first workload can include VM 1, VM 2, VM 3, and VM 5. VM 1, VM 2, VM 3, and VM 5 are all synchronized within vCD 1. Reference clock 1 is the reference clock for vCD 1. A second workload can include VM 4 and VM 6. VM 4 and VM 6 are synchronized within vCD 2. Reference clock 2 is the reference clock for vCD 2.

NIC 1 803, installed in host computer 1 804, includes HW clock A and synchronizes HW clock A to reference clock 1. NIC 2 805, installed in host computer 2 806, includes HW clock B and HW clock C. NIC 2 synchronizes HW clock B to reference clock 1 and synchronizes HW clock C to reference clock 2. NIC 3 807, installed on host computer 3 808, includes HW clock D and HW clock E. NIC 3 synchronizes HW clock D to reference clock 1 and synchronizes HW clock E to reference clock 2. VM 1 and VM 2 can read time values from HW clock A via vCD access points provided by NIC 1. VM 3 can read time values from HW clock B via a vCD access point provided by NIC 2. VM 4 can read time values from HW clock C via a vCD access point provided by NIC 2. VM 5 can read time values from HW clock D via a vCD access point provided by NIC 3. VM 6 can read time values from HW clock E via a vCD access point provided by NIC 3. Note that LAN 2 could have its own CD 3 and CD 9 that may be unrelated to the CD 3 and CD 9 of LAN 1.

Figure 9:
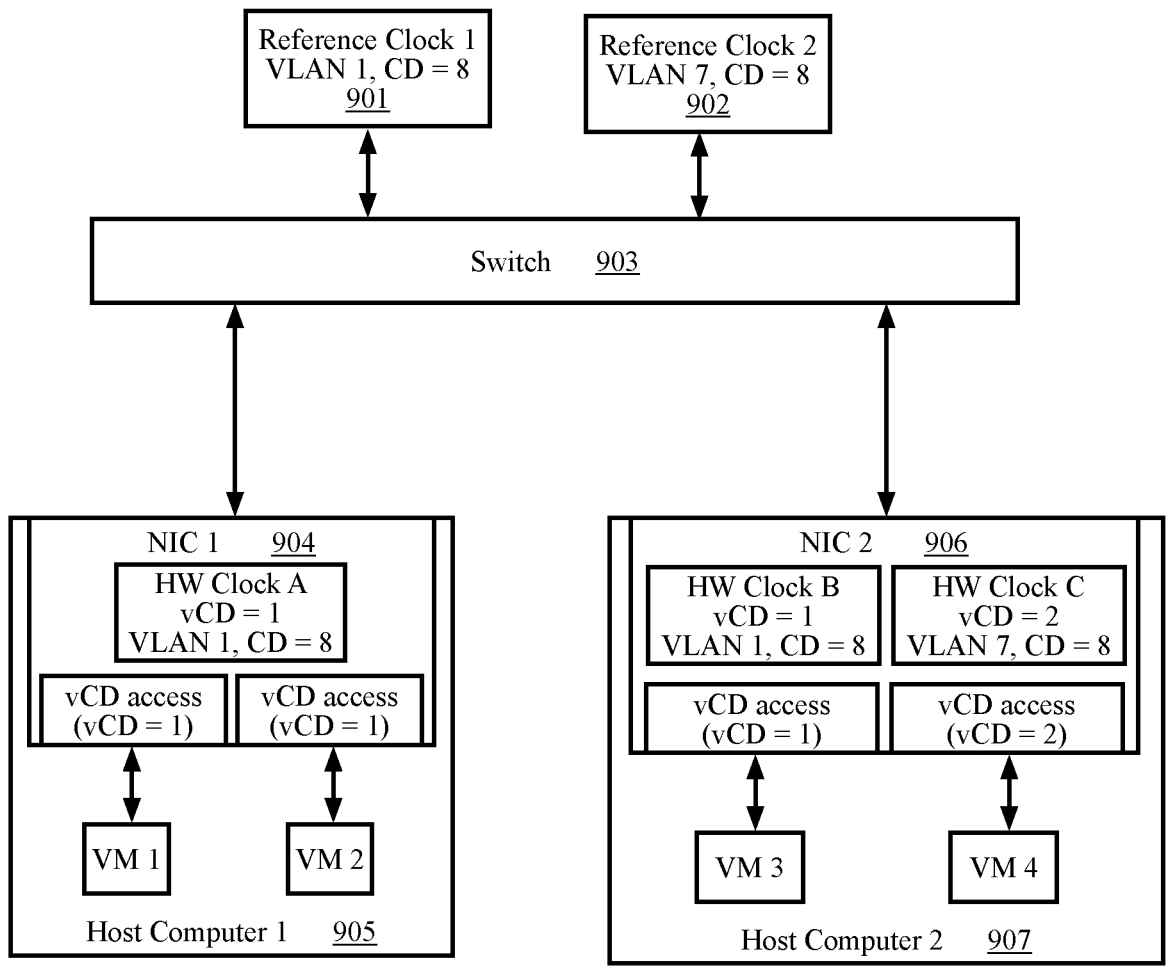
FIG. 9 is a high-level diagram illustrating VMs on different host computers accessing vCDs on different virtual LANs (VLANs) according to some aspects.

FIG. 9 is a high-level diagram illustrating VMs on different host computers accessing vCDs on different virtual LANs (VLANs) according to some aspects. vCD 1 maps to CD 8 on VLAN 1. vCD 2 maps to CD 8 on VLAN 2. Clock domains on different VLANs can be completely unrelated to one another. For example, the clock domain CD 23 on VLAN 10 may be completely unrelated to the clock domain CD 23 on VLAN 11. Reference clock 1 901 is the reference clock for vCD 1. Reference clock 2 902 is the reference clock for vCD 2. NIC 1 904, installed in host computer 1 905, synchronizes HW clock A to reference clock 1. NIC 2 906, installed in host computer 2, synchronizes HW clock B to reference clock 1 and synchronizes HW clock C to reference clock 2. VM 1 and VM 2 can read time values from HW clock A via a vCD access points provided by NIC 1. VM 3 can read time values from HW clock B via a vCD access point provided by NIC 2. VM 4 can read time values from HW clock C via a vCD access point provided by NIC 2.

Figure 10:
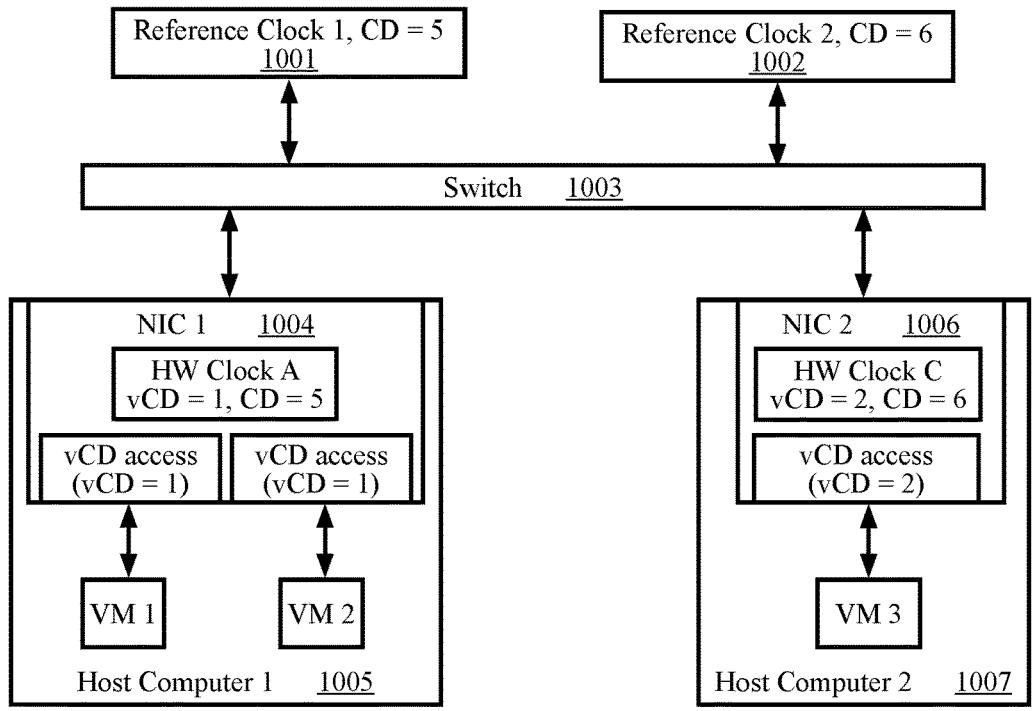
FIG. 10 is a high-level diagram illustrating VMs on different host computers accessing vCDs according to some aspects.
Figure 11:
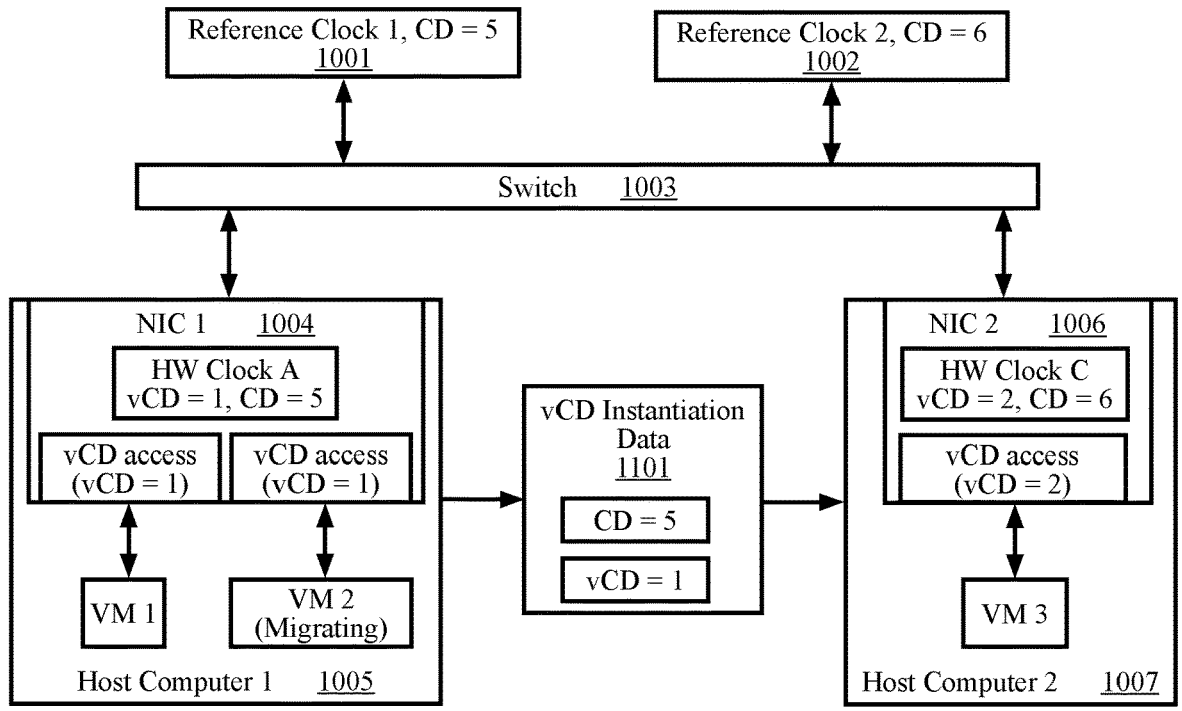
FIG. 11 is a high-level diagram illustrating host computers sharing vCD instantiation data in preparation for virtual machine (VM) migration according to some aspects.
Figure 12:
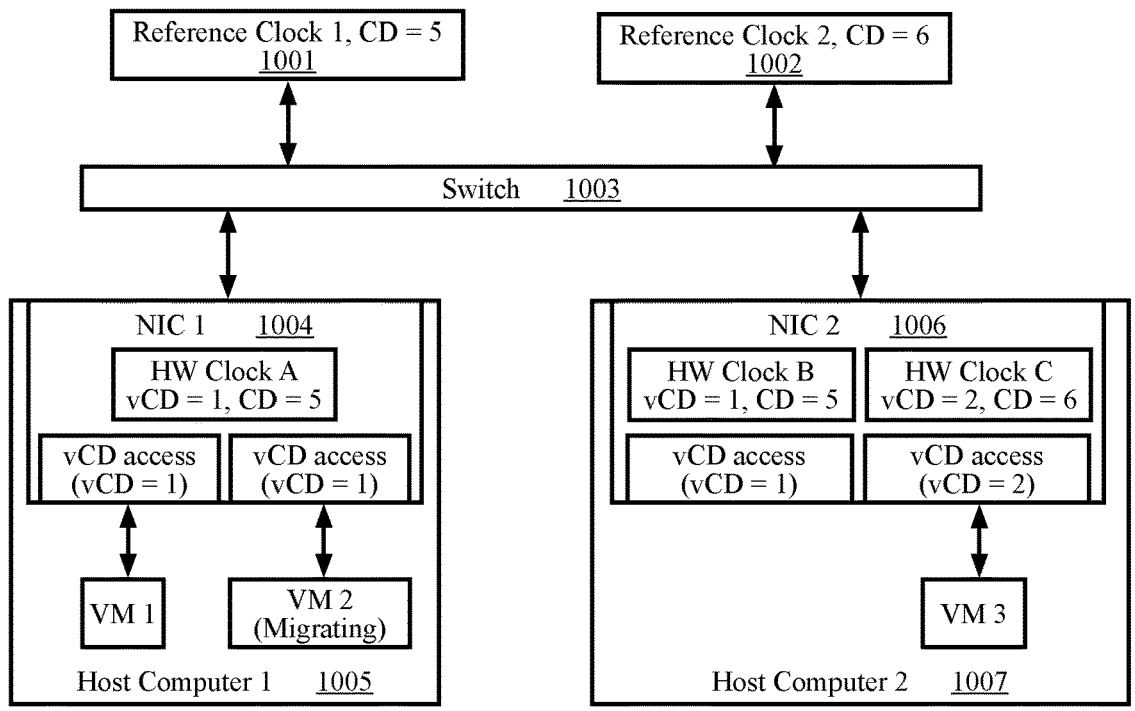
FIG. 12 is a high-level diagram illustrating a host computer instantiating a vCD in preparation for virtual machine (VM) migration according to some aspects.
Figure 13:
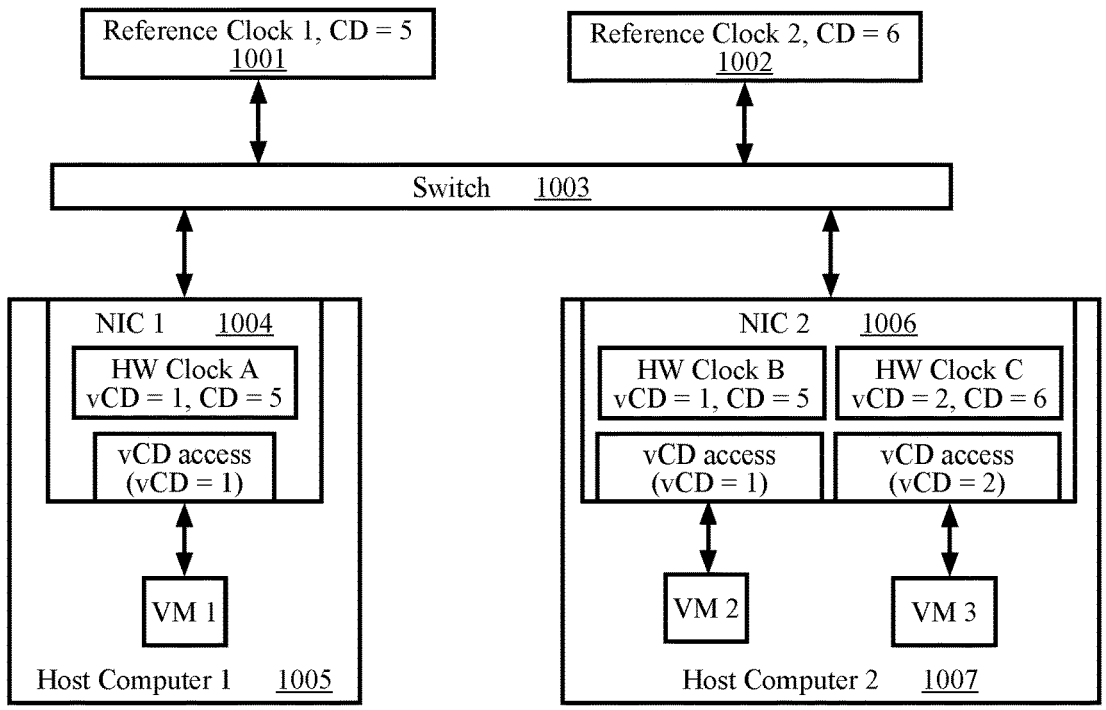
FIG. 13 is a high-level diagram illustrating a VM in a vCD that has migrated between host computers according to some aspects.

FIGS. 10-13 illustrate a VM migrating from one host to another. An aspect of migrating a VM is that the vCD for the VM may need to be instantiated on the destination host computer. FIG. 10 illustrates the initial state of the VMs and hosts. FIG. 11 illustrates vCD instantiation data being transferred to the destination host. FIG. 12 illustrates the host computer implementing the vCD for the migrating VM. FIG. 13 illustrates the VM migrated to the destination host.

FIG. 10 is a high-level diagram illustrating VMs on different host computers accessing vCDs according to some aspects. vCD 1 maps to CD 5. vCD 2 maps to CD 6. Reference clock 1 1001 is the reference clock for vCD 1. Reference clock 2 1002 is the reference clock for vCD 2. NIC 1 1004, installed in host computer 1 1005, synchronizes HW clock A to reference clock 1. NIC 2 1006, installed in host computer 2 1007, synchronizes HW clock C to reference clock 2. VM 1 and VM 2 can read time values from HW clock A via vCD access points provided by NIC 1. VM 3 can read time values from HW clock C via a vCD access point provided by NIC 2.

FIG. 11 is a high-level diagram illustrating host computers sharing vCD instantiation data 1101 in preparation for virtual machine (VM) migration according to some aspects. The vCD instantiation data can include information from a row of the vCD to CD to HW clock mapping table. In this example, the CD identifier and the vCD identifier are sufficient. Additional data may be needed if the destination for the VM is on a different LAN or VLAN. That additional data can include identifiers for one or more of the source CD, destination CD, source LAN, destination LAN, source VLAN, and destination VLAN. In some implementations, communicating the vCD may be sufficient. A SmartNIC or other device can query a data store, such as a vCD orchestration data store, using the vCD. A vCD orchestration data store can associate the vCD with vCD instantiation data that can include the CD, LAN, reference clock, and other information. The vCD orchestration data store can return the vCD instantiation data in response to a query that includes the vCD identifier.

FIG. 12 is a high-level diagram illustrating a host computer instantiating a vCD in preparation for virtual machine (VM) migration according to some aspects. NIC 2 has instantiated vCD 1 and is synchronizing HW clock B to reference clock 1. A PCIe VF is configured as a vCD access point for the migrating VM. VM 2 is shown as migrating. The process for migrating a VM (without a vCD) from one host to another is understood by those practiced in cloud infrastructure or hypervisors.

FIG. 13 is a high-level diagram illustrating a VM in a vCD that has migrated between host computers according to some aspects. VM 2 is running on host computer 2 1007. VM 2 can read time values from HW clock B via a vCD access point provided by NIC 2. HW clock B is synchronized with vCD 1 which has reference clock 1 as the reference clock.

Figure 14:
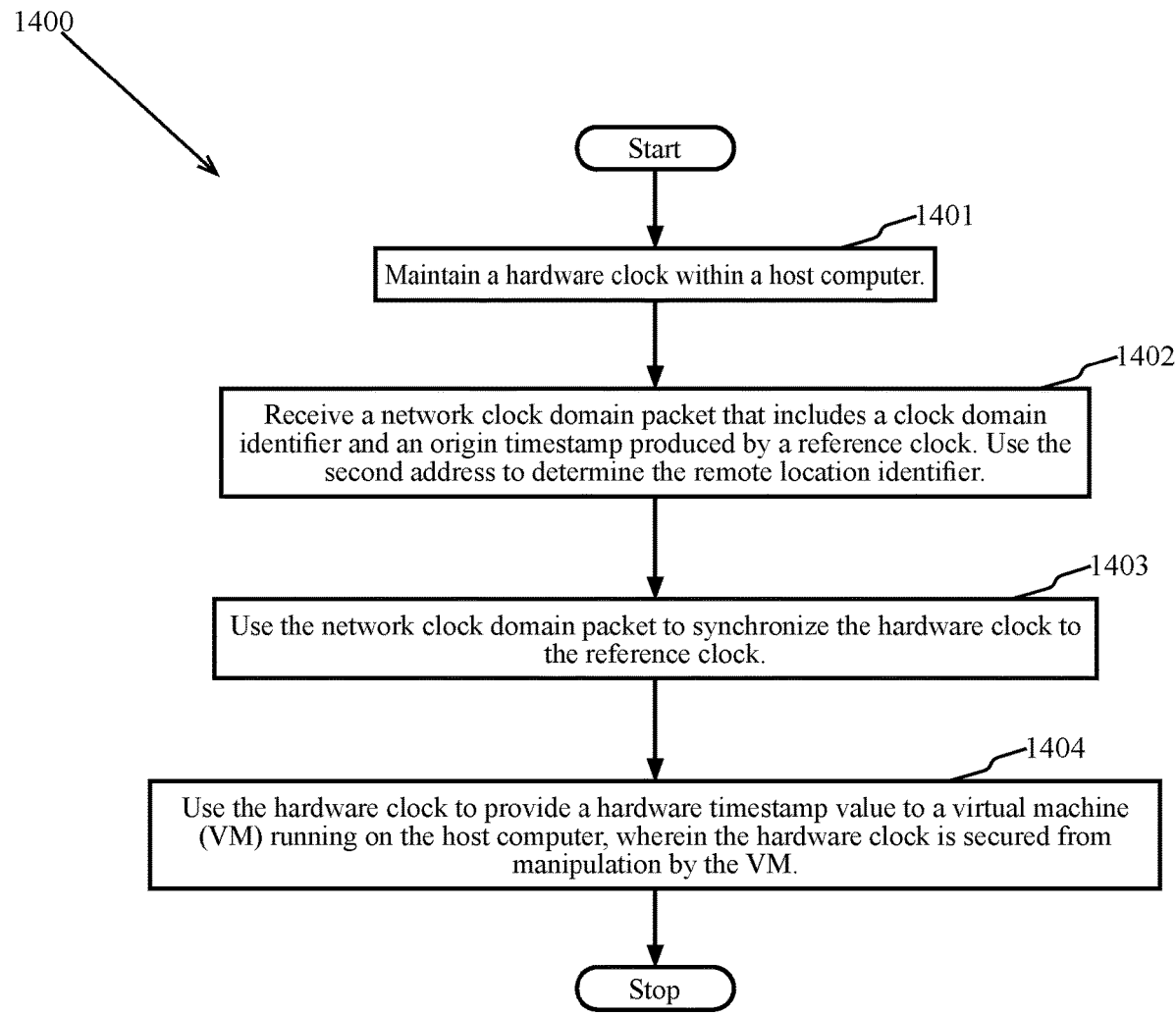
FIG. 14 is a high-level flow diagram illustrating a method for providing a distributed clock as a service according to some aspects.

FIG. 14 is a high-level flow diagram illustrating a method for providing a distributed clock as a service according to some aspects. After the start, at block 1401 the method can maintain a hardware clock within a host computer. At block 1402 the method can receive a network clock domain packet that includes a clock domain identifier and an origin timestamp produced by a reference clock. At block 1403, the method can use the network clock domain packet to synchronize the hardware clock to the reference clock. At block 1404, the method can use the hardware clock to provide a hardware timestamp value to a virtual machine (VM) running on the host computer or to a process running on the host computer, wherein the hardware clock is secured from manipulation by the VM or by the process.

Figure 15:
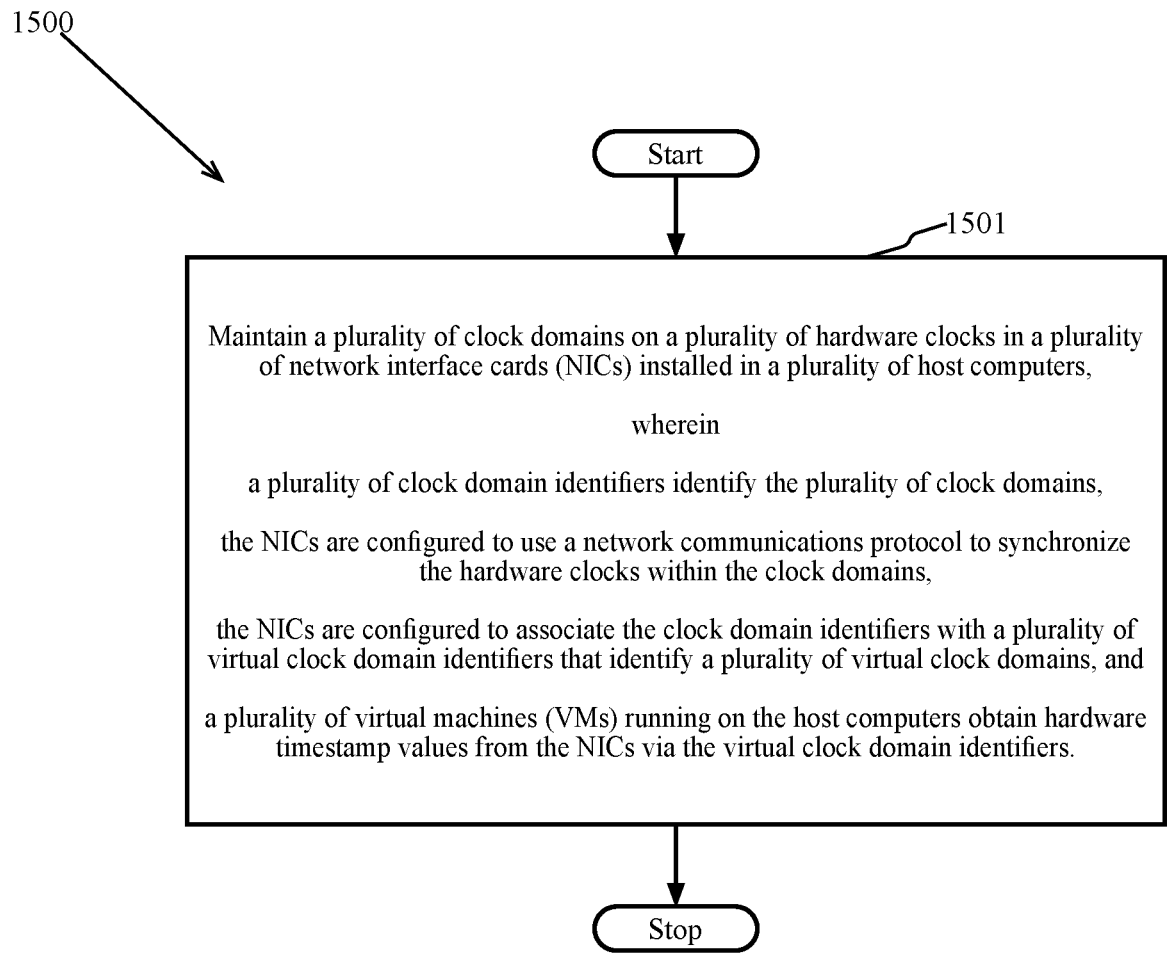
FIG. 15 is a high-level flow diagram illustrating another method for providing a distributed clock as a service according to some aspects.

FIG. 15 is a high-level flow diagram illustrating another method for providing a distributed clock as a service according to some aspects. At block 1501, the method can maintain a plurality of clock domains on a plurality of hardware clocks in a plurality of network interface cards (NICs) installed in a plurality of host computers, wherein a plurality of clock domain identifiers identify the plurality of clock domains, the NICs are configured to use a network communications protocol to synchronize the hardware clocks within the clock domains, the NICs are configured to associate the clock domain identifiers with a plurality of virtual clock domain identifiers that identify a plurality of virtual clock domains, and a plurality of virtual machines (VMs) running on the host computers obtain hardware timestamp values from the NICs via the virtual clock domain identifiers.

Figure 16:
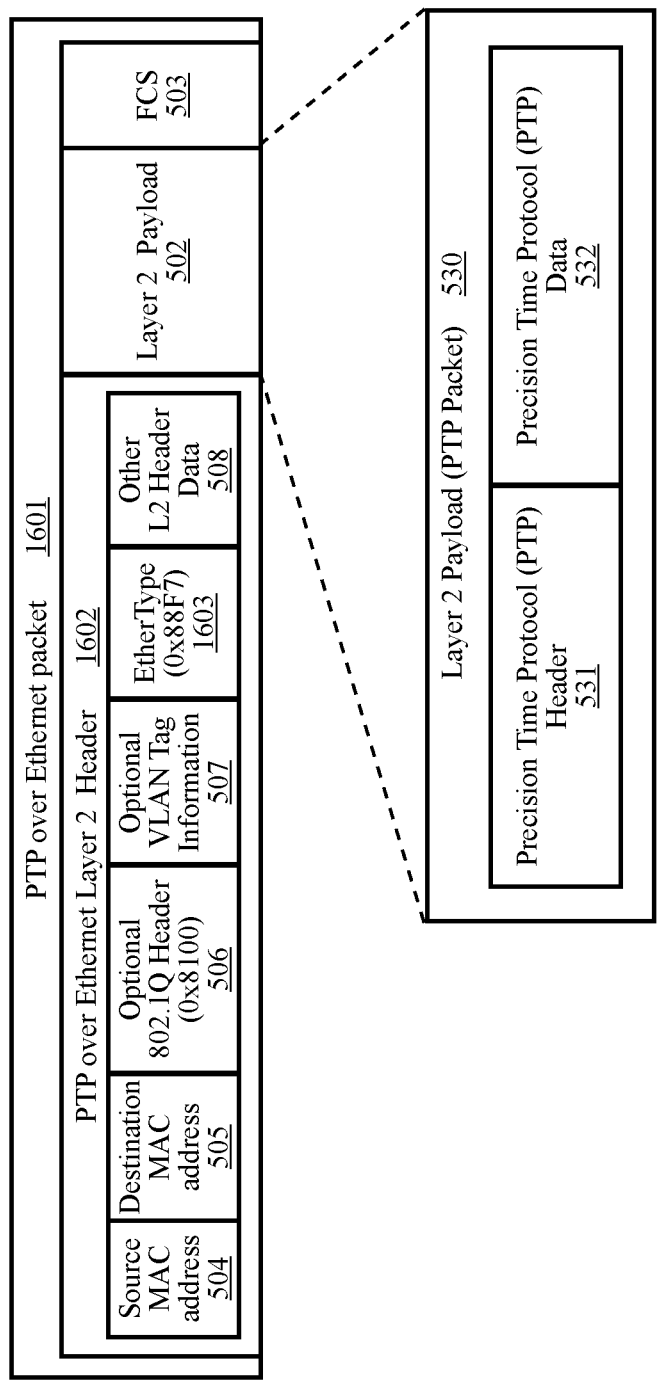
FIG. 16 illustrates a layer 2 PTP packet that can be used in accordance with certain aspects.

FIG. 16 illustrates a layer 2 PTP packet 1601 that can be used in accordance with certain aspects. As discussed above, PTP packets can be the payloads of UDP packets. The PTP specification also provides for carrying PTP packets as ethernet payloads. The PTP over ethernet packet 1601 includes a PTP over ethernet layer 2 header 1602 and a layer 2 payload 502. Ethernet headers include an EtherType field 1603. A value of 0x88F7 in the EtherType field 1603 indicates that the packet is a PTP over ethernet packet having a PTP packet 530 as the layer 2 payload 502.

The previous discussion described aspects using PTP as an enabling technology for illustrative purposes only. Those practiced in the arts of computer networking and clock synchronization are aware of numerous other technologies that may be used instead of PTP. A vCD identifier may be associated with a specifier for a synchronization technology. For example, a vCD may be associated with PTP, NTP, or another technology. Furthermore, different vCDs may be associated with different synchronization technologies depending on where they are used. For example, in one LAN or data center, synchronization of a vCD can be accomplished with PTP and in another data center the same vCD may be synchronized via NTP. More specifically, a vCD associated with PTP in a first LAN can be synchronized via PTP in that first LAN. That same vCD can be associated with another synchronization technology, such as NTP, in a second LAN and will therefore be synchronized via that other synchronization technology in that second LAN.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
   a plurality of hardware clocks;
   a memory; and
   a processor coupled to the hardware clocks and the memory,
   wherein the memory, the processor, and the hardware clocks are configured to provide a plurality of hardware timestamp values to a plurality of processes running in a plurality of virtual clock domains (vCDs) associated with a plurality of clock domains (CDs) by:
      storing a map that 1) associates the vCDs with the hardware clocks, and 2) associates the hardware clocks with the CDs;
      synchronizing one of the hardware clocks to a reference clock in response to receiving a network clock domain packet that includes a clock domain identifier of one of the CDs and an origin timestamp produced by the reference clock; and
      providing a hardware timestamp value from the one of the hardware clocks to a process running in one of the vCDs,
   wherein the map associates the one of the hardware clocks with the one of the CDs and the one of the vCDs.

2. The system of claim 1, the processor is configured to provide a local hardware clock quality metric to the process.

3. The system of claim 1 further including:
   a network interface card (NIC) configured for installation in a host computer,
   wherein the NIC includes the hardware clocks, the memory, and the processor.

4. The system of claim 3 wherein
   the hardware clock is secured from manipulation by any process or by any virtual machine (VM) running on the host computer.

5. The system of claim 3 wherein the hardware clock is secured from manipulation by the host computer.

6. The system of claim 1 wherein
   the process is a virtual machine (VM) that uses a vCD identifier of the one of the vCDs to obtain the hardware timestamp value.

7. The system of claim 6 wherein:
   the VM is associated with the vCD identifier to identify the vCD of the VM.

8. The system of claim 1 further comprising:
   the processor, the memory, and the plurality of hardware clocks are configured to synchronize the plurality of hardware clocks to a plurality of reference clocks.

9. The system of claim 1 wherein the processor, memory, and hardware clocks are further configured to migrate a VM running in the one of the vCDs from a first host computer to a second host computer, wherein migrating the VM to the second host computer includes:
   mapping the one of the vCDs and the one of the CDs to a second hardware clock at the second host computer; and
   synchronizing the second hardware clock to the reference clock in response to receiving a second network clock domain packet.

10. The system of claim 1 wherein
a second NIC installed in a second host computer includes a second hardware clock,
the one of the hardware clocks and the second hardware clock are synchronized within the one of the CDs, and
the second NIC associates a vCD identifier with a second clock domain identifier that is different from the clock domain identifier.

11. The system of claim 1 wherein:
the network clock domain packet is received on a first virtual local area network (VLAN) having a first VLAN identifier;
a second network clock domain packet that includes the clock domain identifier is received on a second VLAN having a second VLAN identifier;
the clock domain identifier in combination with the VLAN identifier identifies a clock domain; and
the clock domain identifier in combination with the second VLAN identifier identifies a second clock domain that is different from the clock domain.

12. The system of claim 1 wherein the vCDs outnumber the CDs.

13. A method comprising:
storing a map that 1) associates a plurality of vCDs with a plurality of hardware clocks and 2) associates the hardware clocks with a plurality of clock domains (CDs);
synchronizing one of the hardware clocks to a reference clock in response to receiving a network clock domain packet that includes a clock domain identifier of one of the CDs and an origin timestamp produced by the reference clock; and
mapping from a vCD identifier to the one of the hardware clocks to provide a hardware timestamp value produced by the one of the hardware clocks to a process that is in the one of the vCDs,
wherein the map associates the one of the hardware clocks with the one of the CDs and the one of the vCDs.

14. The method of claim 13, further including instantiating an additional one of the CDs in response to receiving virtual clock domain instantiation data.

15. The method of claim 13 wherein the process is a VM running on a host computer and wherein VMs running on the host computer are prevented from manipulating the one of the hardware clocks.

16. The method of claim 15 wherein
the network clock domain packet is received on a virtual local area network (VLAN) that is configured to exclude network traffic to or from any one of the VMs.

17. A system comprising:
a network interface card (NIC) that includes a plurality of hardware clocks, a memory, and a processor,
wherein the memory, the processor, and the hardware clocks are configured to provide a plurality of hardware timestamp values to a plurality of processes running in a plurality of virtual clock domains (vCDs) associated with a plurality of clock domains (CDs) by:
storing a map that 1) associates the vCDs with the hardware clocks and 2) associates the hardware clocks with the CDs;
synchronizing one of the hardware clocks to a reference clock in response to receiving a network clock domain packet that includes a clock domain identifier of one of the CDs and an origin timestamp produced by the reference clock; and
providing a hardware timestamp value from the one of the hardware clocks to a process running in one of the vCDs,
wherein the map associates the one of the hardware clocks with the one of the CDs and the one of the vCDs.

18. The system of claim 17, wherein the NIC is configured to:
receive virtual clock domain instantiation data for an additional virtual clock domain; and
provide an additional hardware timestamp value based on the additional virtual clock domain.

19. The system of claim 17, wherein the NIC is configured to:
produce virtual clock domain instantiation data based on the map; and
transmit the virtual clock domain instantiation data to an additional peripheral component card.

20. The system of claim 17, wherein the NIC is configured to be installed in a host computer running a virtual machine (VM) and to provide a local hardware clock quality metric to the VM.

* * * * *